(12) United States Patent
Ericksson

(10) Patent No.: US 6,299,181 B1
(45) Date of Patent: Oct. 9, 2001

(54) VEHICLE HAVING STEERABLE WHEELS

(75) Inventor: Jan A. Ericksson, Osterfarnebo (SE)

(73) Assignee: Caterpillar S.A.R.L., Geneva (CH)

(*) Notice: Subject to any disclaimer, the term of this patent is extended or adjusted under 35 U.S.C. 154(b) by 0 days.

(21) Appl. No.: 09/732,166

(22) Filed: Dec. 7, 2000

(51) Int. Cl.[7] .................................................. B60G 17/00
(52) U.S. Cl. ..................... 280/6.156; 180/418; 280/404; 280/124.128; 280/93.504
(58) Field of Search ............................. 280/5.507, 6.155, 280/6.154, 6.156, 404, 411.1, 414.5, 419, 442, 426, 124.128, 124.116, 124.117, 124.122, 93.504; 180/14.1, 432, 436, 438, 418

(56) References Cited

U.S. PATENT DOCUMENTS

| | | |
|---|---|---|
| 3,092,201 | 6/1963 | Biek . |
| 3,194,581 * | 7/1965 | Brueder ............................. 180/438 |
| 3,450,222 * | 6/1969 | Ohlson . |
| 3,779,581 * | 12/1973 | Scheuerpflug . |
| 3,782,491 | 1/1974 | Herbenar . |
| 3,899,037 * | 8/1975 | Tuker ................................. 180/6.48 |
| 3,903,983 | 9/1975 | Yeske . |
| 4,175,638 | 11/1979 | Christensen . |
| 4,359,123 | 11/1982 | Haupt et al. . |
| 4,431,074 | 2/1984 | Langerud . |
| 4,449,600 | 5/1984 | Telfer . |
| 4,483,552 | 11/1984 | Dorscht . |
| 4,602,800 * | 7/1986 | Persson ............................. 280/683 |
| 5,308,216 * | 5/1994 | Herolf ............................... 414/550 |
| 5,364,116 | 11/1994 | Houle et al. . |
| 5,366,337 * | 11/1994 | Eriksson ........................... 414/550 |
| 5,915,701 * | 6/1999 | Heyring ............................ 280/6.155 |
| 5,918,692 * | 7/1999 | Sekita et al. .................... 280/124.128 |

* cited by examiner

Primary Examiner—Anne Marie Boehler
(74) Attorney, Agent, or Firm—Nexsen Pruet Jacobs & Pollard, LLP

(57) ABSTRACT

A log hauler having a wheeled tractor and one or more wheeled log trailers with support wheels which are individually steerable to permit the log hauler to travel in a serpentine manner through a tree harvesting area. The support wheels are vertically adjustable to provide stability as the log hauler traverses uneven ground.

14 Claims, 2 Drawing Sheets

VEHICLE HAVING STEERABLE WHEELS

TECHNICAL FIELD

This invention relates generally to vehicle steering and more particularly to a steering system which improves performance of log haulers operating on rough terrain or in forests.

BACKGROUND ART

Highway vehicles and many off-highway vehicles have used stub axles to support steerable wheels. Typically, in such a construction, a pair of stub axles are pivotally connected on nearly vertical axes to opposite ends of a transverse axle. The U.S. Pat. No. 3,903,983 issued to Laurel R. Yeske for Steering System for Vehicles shows a vehicle having four stub axle supported steerable wheels together with a control system for selectively choosing front steering, rear steering, front and rear steering, crab steering and parallel steering. Some off-highway vehicles are provided with central steering wherein front and rear sections of a vehicle are pivoted about a central vertical pivot. The previously used or suggested steering arrangements are not satisfactory for steering a multiple section log hauler or forwarder in a serpentine fashion through a tree harvesting area. Also they do not provide satisfactory adjustment of the support wheels of a multiple section log hauler to maintain a satisfactory load center as the various sections of the log hauler traverse the uneven terrain usually associated with wood lands and forests.

The present invention is directed to overcoming one or more of the problems or disadvantages associated with the prior art.

DISCLOSURE OF THE INVENTION

A steering arrangement is provided for a log hauler having a tractor and a plurality of log trailers joined by central vertical pivot connections. The steering arrangement includes steering mechanism for causing steering about the central vertical pivots and steering mechanism for steering each of the support wheels. All the support wheels are steerable relative to a chassis of the tractor or the log trailer they support, thereby providing a very maneuverable vehicle for moving in serpentine fashion over irregular terrain often found in wooded areas. The lateral stability of the log hauler is greatly enhanced by also making the steerable support wheels vertically adjustable relative to the chassis of the log hauler sections. Each of the steerable support wheels is rotatably supported on one end of a pendulum arm which has its other end pivotally connected to a chassis through a connector which allows the pendulum arm to swing vertically relative to the connector. The connector is pivotally connected to the chassis of the tractor or one of the log trailers for pivotal steering movement about a vertical pivot axis. Power operated actuators are used to control the swinging movement of the pendulum arm and to control the pivotal steering movement of the carrier relative to the chassis structure.

BEST MODE FOR CARRYING OUT THE INVENTION

Figure 1:
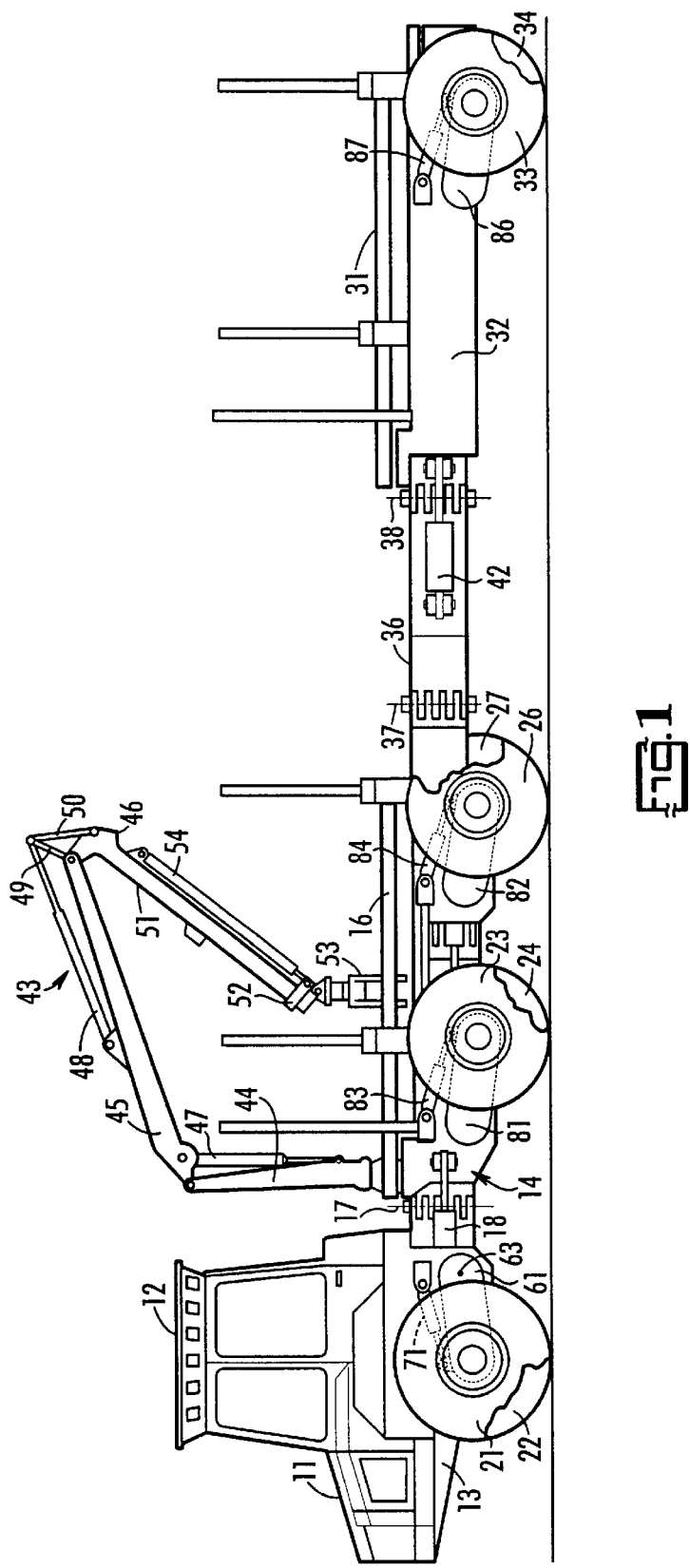
FIG. 1 is a side view of a multi-section, tractor powered log hauler.

The log hauler or forwarder illustrated in FIG. 1 is primarily used to load and transport cut timber or logs out of the woodland or forest to a storage, shipping or processing location. Although the log hauler may at times be operated on hard surfaces roads, it is especially designed to travel on uneven terrain and in forests to load logs near the point of harvesting, thereby minimizing the building of logging roads and the expense and damage incurred in skidding the logs long distances. The illustrated log hauler includes a train of vehicle sections interconnected on vertical pivot axes. The log hauler includes a two wheel tractor 11 which is powered by an internal combustion engine, not shown, and is equipped with an operator's station or cab 12. The tractor 11 has a chassis 13 extending in the direction of travel which is pivotally connected to the chassis 14 of a first log trailer 16 for steering movement about a vertical pivot axis 17. A hydraulic actuator 18 for effecting steering of the tractor about the axis 17 has a cylinder end pivotally connected to the chassis 13 of the tractor 11 and a rod end pivotally connected to the chassis 14 of the log trailer 16. The tractor 11 includes a pair of traction wheels 21, 22 which are driven by an engine, not shown, mounted on the chassis 13 of the tractor 11. The chassis 14 of the log trailer 16 is supported at its front end by a pair of laterally spaced wheels 23, 24 and is supported at its rear end by a pair of laterally spaced wheels 26, 27.

A second log trailer 31 includes a chassis 32 which is supported by a pair of laterally spaced wheels 33, 34. The second log trailer 31 is connected in towed relation to the first log trailer 16 by a longitudinally extending link or tongue 36. The front end of the tongue 36 is pivotally connected on a vertical pivot axis 37 to the chassis 14 of the first log trailer 16. The rear end of the tongue 36 is pivotally connected to the chassis 32 of the second log trailer 31 on a vertical pivot axis 38. Steering movement of the tongue 36 relative to the second log trailer 31 is controlled by a hydraulic actuator 42 having a cylinder end pivotally connected to the tongue 36 and a rod end pivotally connected to the chassis 32 of the second log trailer 31.

A logging crane 43 includes a mast 44 rigidly mounted on the chassis 14 of the first log carrier 16, a first boom 45 having a rear end pivotally connected to the top of the mast 44 and a second boom 46 which has an upper end pivotally connected to a front end of the first boom 45. A hydraulic actuator 47 is interconnected between the mast 44 and the first boom 45. A hydraulic actuator 48 has its cylinder end pivotally connected to the first boom 45 and its rod end pivotally connected to the upper ends of a pair of links 49, 50. The link 49 is pivotally connected at its lower end to the rear end of the first boom 45 and a lower end of link 50 is pivotally connected to the second boom 46. The second boom 46 includes a hollow casing 51 and an extensible part 52 telescopically fitted in the hollow casing 51. A log grapple 53 is pivotally connected to the extensible part 52. A hydraulic actuator 54 has a cylinder end pivotally connected to the hollow casing 51 and has a rod end pivotally connected to the extensible part 52.

Figure 2:
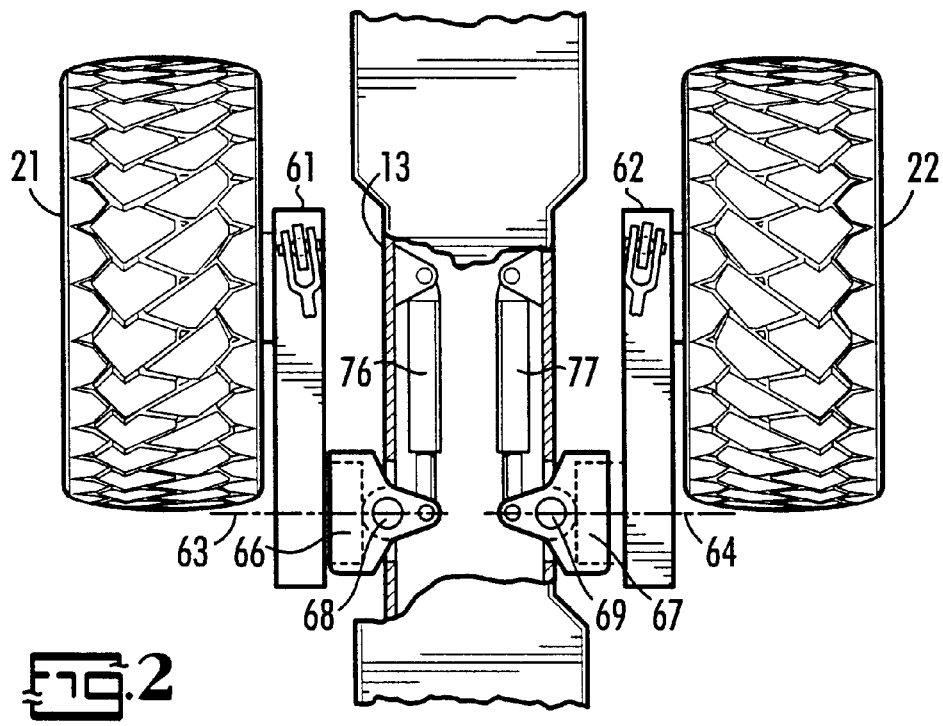
FIG. 2 is a top view of the tractor shown in FIG. 1 with structure broken away to show the pendulum arms connected to the tractor chassis.
Figure 3:
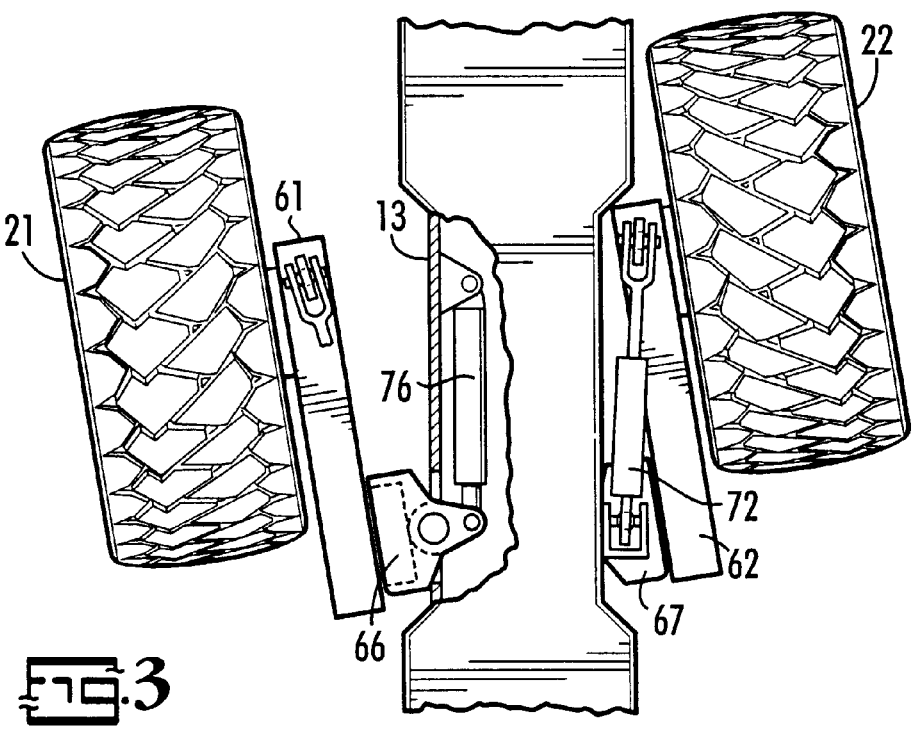
FIG. 3 is a top view similar to FIG. 2 but showing the pendulum arms pivoted relative to the vehicle chassis.

Referring also to FIGS. 2 and 3, the traction wheels 21, 22 are rotatably supported on the front ends of a pair of pendulum arms 61, 62 and the rear ends of the pendulum arms 61, 62 are pivotally supported on a pair of horizontal transverse axes 63, 64 by a pair of carriers 66, 67. The carriers 66, 67 are pivotally connected to the chassis 13 of the tractor 11 on a pair of vertical pivot axes 68, 69. The vertical swinging movement of the pendulum arm 61 about the axis 63 is controlled by a hydraulic actuator 71 having a cylinder end pivotally connected to the tractor chassis 13 and a rod end pivotally connected to the front end of the pendulum arm 61. The vertical swinging movement of the pendulum arm 62 about the axis 64 is controlled by a hydraulic actuator 72 interconnected between the front end of the pendulum arm 62 and the tractor chassis 13. The pendulum arm 61 is steered by operation of a hydraulic actuator 76 interconnected between the tractor chassis 13 and the carrier 66 and the pendulum arm 62 is steered by operation of a hydraulic actuator 77 interconnected between the tractor chassis 13 and the carrier 67.

As shown in FIG. 1, the first log trailer 16 is carried on its left hand side, as viewed in the direction of travel, by the wheels 23, 26 which are mounted, respectively, on steerable and vertically adjustable pendulum arms 81, 82. The pendulum arms 81, 82 are supported on the chassis 14 of the first log trailer 16 in the same manner as the pendulum arms 61, 62 are supported on the tractor chassis 13. Vertical swinging movement of the pendulum arms 81, 82 is controlled by a pair of hydraulic actuators 83, 84 which have their cylinder ends pivotally connected to the first log trailer chassis 14 and their rod ends pivotally connected to pendulum arms 81, 82. The wheels 24, 27 on the right hand side of the first log trailer 16 are positioned in transversely opposite relation to the wheels 23, 26 and are mounted on steerable and vertically adjustable pendulum arms, not shown, in the same manner as the pendulum arms 61, 62. The carriers for the transversely opposite pendulum arms carrying the wheels 23, 24 are steered by hydraulic actuators, not shown, in the same manner as the traction wheels 21, 22.

The wheels 26, 27 are mounted on the chassis 14 of the first log trailer 16 in the same manner as the wheels 23, 24 are mounted on the first log trailer 16. In a similar manner, the second log trailer 31 is supported at its laterally opposite sides by the wheels 33, 34. As illustrated in FIG. 1, the wheel 33 is rotatably mounted on a pendulum arm 86, the vertical swinging adjustment of which is controlled by a hydraulic actuator 87 interconnected between the chassis 32 and the pendulum arm 86. The two sets of wheels 23, 24 and 26, 27 supporting the first log trailer 16 and the single set of wheels 33, 34 supporting the second log trailer 31 are reverse images of the set of wheels 21, 22 supporting the tractor 11.

A hydraulic control system, not shown, is provided for the steering actuators which causes the trailing sections 16, 31 of the log hauler to follow the steered path of the tractor 11. An automatic control, not shown, adjusts the vertical swinging movement of the pendulum arms to keep the chassis of the log hauler sections level.

Industrial Applicability

A log hauler constructed in accordance with this invention is a multiple section vehicle which is capable of traveling over uneven terrain and through forest or wooded areas where tree harvesting operations are carried out. Heretofore, logging roads were built in the forests and wooded areas being harvested so that logging trucks, primarily of on-highway design, could be used to travel into the harvesting area to be loaded with logs assembled at a pick-up point by log skidders. Building roads is expensive and is detrimental to the environment because of the necessary ditches, cuts and fills. Road building activity causes soil erosion and makes reforestation more difficult in those areas disturbed by the road building activity. The log hauler of this invention minimizes the need for logging roads because it can safely travel over uneven terrain even when loaded and therefore it can travel to and load logs near the point where the trees are cut down in the harvesting operation. By loading the logs close to the point of tree cutting, there is reduced skidding or dragging of logs to a pick up point.

The ability to control the articulation of the vehicle sections and steer the support wheels 21, 22, 23, 24, 26, 27, 33, 34, permits the log hauler to move in a serpentine path through forests and cut over areas with stumps. When uneven terrain is encountered, an automatic leveling control adjusts the vertical position of the support wheels to compensate for the ground irregularity. Each section of the log hauler is provided with an automatic leveling control system to maintain the load center near a laterally centered position between its support wheels. The control system for steering and the control system for adjusting the vertical position of the support wheels are designed to operate at the same time, as is necessary when traveling in a winding path over uneven ground surface. The control system for vertically adjusting the support wheels also permits the vehicle sections to be raised when traveling over stumps or boulders during a tree harvesting operation.

The crane 44 is capable of loading logs on both log trailers 16, 31. The extensible boom 53 of the crane 44 allows the crane 44 to load logs on the second trailer 31 and extends the reach of the crane 44 for picking up logs and unloading logs.

Other aspects and features of the present invention can be obtained from a study of the drawings, the disclosure, and the appended claims.

What is claimed is:

1. A log hauler comprising;
   a tractor including
      a tractor chassis extending longitudinally in the direction of travel of said tractor and having laterally opposite sides,
      an operator's station on said tractor chassis,
      a carrier pivotally connected to each of said laterally opposite sides of said tractor chassis for steering movement of said carrier about a vertical axis,
      a pair of pendulum arms extending longitudinally alongside said tractor chassis and having first and second corresponding ends, said first corresponding ends being connected, respectively, to said carriers,
      traction wheels rotatably supported on said second corresponding ends of said pendulum arms and
      a pair of hydraulic actuators interconnected between said tractor chassis and said carriers, respectively, operable to effect steering movement of said pendulum arms about said vertical axes and
      a first log trailer pivotally connected to said tractor.

2. The log hauler of claim 1 wherein said pendulum arms are pivotally connected to said carriers on horizontal transverse axes permitting vertical swinging movement of said pendulum arms and further including a pair of power actuators interconnected between said tractor chassis and said pendulum arms, respectively, and operable to pivot said pendulum arms about said horizontal transverse axes.

3. The log hauler of claim 1 wherein said pendulum arms extend forward from said carriers.

4. The log hauler of claim 1 wherein said first log trailer is connected to said tractor on a substantially vertical axis.

5. The log hauler of claim 4 having a hydraulic actuator between said tractor and said first log trailer operable to control steering movement about said substantially vertical axis.

6. The log hauler of claim 4 wherein said first log trailer includes a trailer chassis supported at each of its lateral sides by at least one wheel, each of which is rotatably mounted on one end of a pendulum arm extending longitudinally alongside said trailer chassis, the other end of said pendulum arm being pivotally connected to said trailer chassis of said first log trailer for steering movement about a substantially vertical axis.

7. The log hauler of claim 6 wherein each of said pendulum arms is connected to its associated chassis by a carrier having a pivot connection with the associated pendulum arm which permits said associated pendulum arm to swing vertically and further having power actuators mounted on said associated chassis and connected, respectively, to said pendulum arms, said power actuators being selectively operable to swing said pendulum arms vertically about said pivot connections.

8. The log hauler of claim 7 wherein said first log trailer includes at least two ground engaging wheels at each lateral side of said trailer chassis, each of said ground engaging wheels being rotatably mounted on a pendulum arm which is steerable and vertically swingable relative to said trailer chassis.

9. A log hauler comprising:
   an engine driven tractor for moving said log hauler in a predetermined direction of travel, said tractor having a chassis with laterally opposite sides and including a support wheel at each of said laterally opposite sides,
   a first log trailer connected in towed relation to said tractor including a chassis having laterally opposite sides and at least a front support wheel and a rear support wheel at each of its laterally opposite sides,
   a support assembly for mounting each of said support wheels on its associated chassis including a longitudinally extending pendulum arm pivotally connected at one of its longitudinal ends to said associated chassis for pivotal steering movement about a substantially vertical axis and rotatably mounting one of said support wheels at its other longitudinal end and
   a power actuator interposed between each of said pendulum arms and said associated chassis operable to effect steering movement of said pendulum arms.

10. The log hauler of claim 9 wherein said tractor and said first log trailer are coupled on a central vertical axis and further comprising a power actuator interconnected between said tractor and said first log trailer operable to effect steering about said central vertical axis.

11. The log hauler of claim 9 and further having a second log trailer connected in towed relation to said first log trailer and including a chassis presenting laterally opposite sides, a pair of pendulum arms having first ends pivotally connected on vertical axes, respectively, to said laterally opposite sides of said chassis of said second log trailer and having second ends, a pair of laterally opposite support wheels mounted, respectively, on said second ends of said pendulum arms and a power steering actuator interconnected between each of said pendulum arms and said chassis of said second log trailer.

12. The log hauler of claim 11 wherein said second log trailer is connected to said first log trailer by a longitudinally extending tongue having a first end pivotally connected to said chassis of said first log trailer on a vertical pivot axis and a second end pivotally connected to said chassis of said second log trailer on a vertical pivot axis and a hydraulic actuator interconnected between said tongue and said chassis of said second log trailer operable to control pivotal adjustment of said tongue relative to said chassis of said second log trailer.

13. The log hauler of claim 9 wherein said support assembly includes a carrier pivotally joined to said one longitudinal end of said pendulum arm permitting vertical swinging movement of said pendulum arm relative to said carrier about a horizontal axis, said carrier being pivotally connected to said associated chassis for steering movement about said substantially vertical axis and further comprising a power actuator interposed between each of said pendulum arms and said associated chassis operable to effect vertical swinging of said pendulum arm.

14. A method of building a log hauler comprising the steps of:
   providing a tractor with a chassis extending in the direction of travel of said tractor,
   connecting first corresponding ends of a pair of pendulum arms to laterally opposite sides of said chassis of said tractor for pivotal movement about a pair of laterally spaced vertical axes,
   mounting support wheels on second corresponding ends of said pendulum arms,
   providing a log trailer having a longitudinally extending chassis with laterally opposite sides,
   providing four pendulum arms having corresponding first and second ends,
   pivotally mounting corresponding first ends of a pair of said four pendulum arms on each of the laterally opposite sides on said longitudinally extending chassis on vertical axes spaced from one another in the longitudinal direction of said chassis of said log trailer, and
   mounting a support wheel on said second end of each of said four pendulum arms and
   providing a hydraulic actuator interconnected between each of said pendulum arms and the associated chassis, respectively, said hydraulic actuators being operable to effect steering of said pendulum arms.

* * * * *